United States Patent [19]

Bernou et al.

[11] Patent Number: 4,506,821
[45] Date of Patent: Mar. 26, 1985

[54] ALIGNING AND WELDING SHEET PLATE EDGES

[75] Inventors: Joseph Bernou, Parthenay; Georges Sguazzi, Enghien-les-Bains, both of France

[73] Assignee: La Soudure Autogene Francaise, Paris, France

[21] Appl. No.: 462,329

[22] Filed: Jan. 31, 1983

[30] Foreign Application Priority Data

Feb. 19, 1982 [FR] France .................. 82 02733

[51] Int. Cl.³ ............................................. B23K 37/04
[52] U.S. Cl. ..................................... 228/5.7; 228/56.5
[58] Field of Search ................ 228/5.7, 49 R, 49 C, 228/56.5; 269/303, 315, 319, 320

[56] References Cited

U.S. PATENT DOCUMENTS

| 3,137,936 | 6/1964 | Tomkins | 228/5.7 X |
| 3,198,931 | 8/1965 | Klempay | 228/5.7 X |
| 3,286,342 | 11/1966 | Seeloff et al. | 228/5.7 |
| 3,378,185 | 4/1968 | Wheeler et al. | 228/5.7 X |
| 3,475,580 | 10/1969 | Morley | 228/5.7 |

FOREIGN PATENT DOCUMENTS 550449 2/1957 Belgium .
2326990 12/1974 Fed. Rep. of Germany .

Primary Examiner—Kenneth J. Ramsey
Attorney, Agent, or Firm—Lee C. Robinson, Jr.

[57] ABSTRACT

This invention relates to the alignment of the edge of an element in the form of a sheet or plate of small thickness for the purpose of edge-to-edge assembling of the same with others on a work bench. Each positioning member comprises a translatorily and rotatorily displaceable finger, and a member for control of its linear and angular positioning, the finger being arranged to assume an active position for which it is in contact with the edge of one element and a retracted position for which it allows of laying along-side the edge of a second element. The invention applies in particular to edge-to-edge alignment of steel plates which are plane or shell-shaped for the purpose of butt welding the same on a longitudinal bench.

10 Claims, 5 Drawing Figures

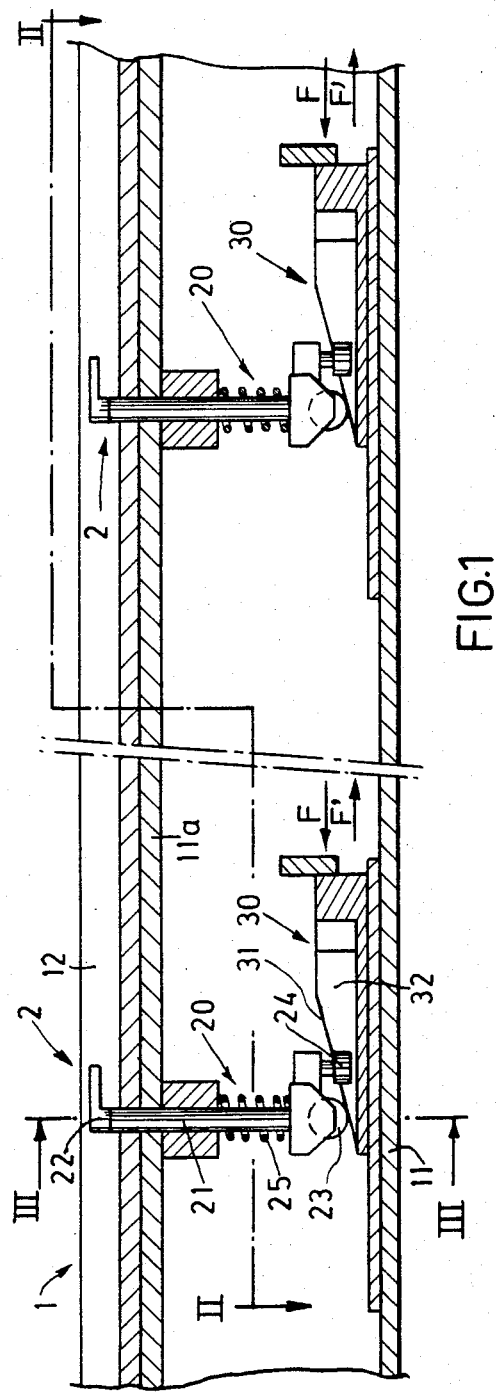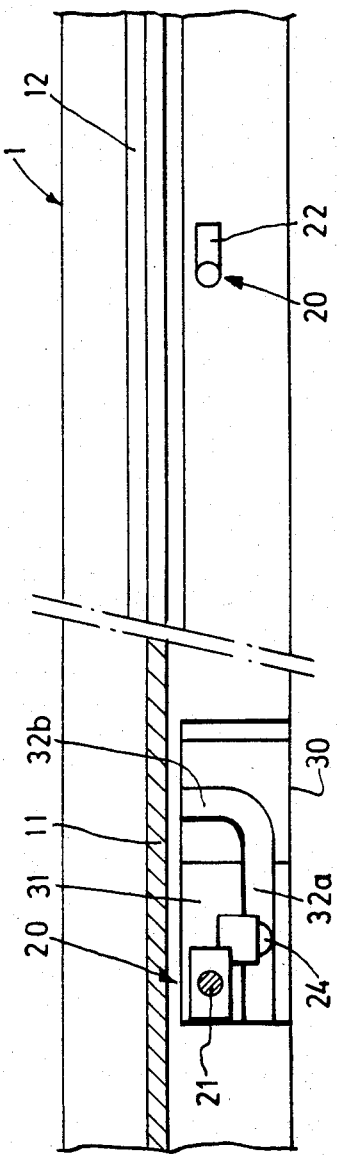

ALIGNING AND WELDING SHEET PLATE EDGES

BACKGROUND OF THE INVENTION

The present invention essentially relates to a device for aligning the edge of an element in the form of a sheet or plate of small thickness, for example the edge of a plane or shell-shaped steel plate, for the purpose of lining up and welding the same to another element or to itself on a longitudinal welding bench provided with a workpiece-carrier beam, of the kind comprising positioning members situated on a line along which it is intended to align the edges of the said elements followed by welding the same.

A device of this kind is utilised for aligning the edge of a plane or shell-shaped plate, for example along the axis of longitudinal displacement of a welding torch on a longitudinal mounting bench, for the purpose of being placed in contact with the edge of the other plate or with its second edge in the case of a shell-shaped plate, for the purpose of carrying out butt welding of the said edges without markings.

Devices of this kind which are known at present, for example from the French Pat. No. 2,391,022, have a sizeable bulk and are of complex structure.

It is an object of the invention to avoid or minimise these drawbacks.

SUMMARY OF THE INVENTION

Accordingly, the invention comprises a device in which each aforesaid positioning member comprises a translatorily and rotatorily displaceable finger and a member for controlling its linear and angular positioning, said finger being arranged to assume an active position for which it is in contact with the edge of one of the aforesaid elements, and a retracted position for which it allows of the laying alongside of the edge of a second such element.

This layout of the positioning members renders it possible to produce an aligning device of lesser bulk and of much simpler structure than heretofore. It will be apparent that in order to set up the joint line, it is necessary to provide at least two positioning members, the spacing between these members being a function of the width of the plates which are to be joined together.

According to another feature of the invention, the finger is fitted to the aforesaid carrier beam and is displaceable in vertical translation and in rotation around an equally vertical axis.

This arrangement corresponds to the optimum conditions for alignment of the plates which are positioned horizontally on the conventional welding benches.

According to yet another feature of the invention, the control member is also fitted on the carrier beam and comprises a cam movable in horizontal translation, co-operating with the aforesaid finger.

BRIEF DESCRIPTION OF THE DRAWINGS

In order that the invention may be more clearly understood, reference will now be made to the accompanying drawings which show one particular embodiment thereof by way of example only and in which:

FIG. 1 is a partial view in cross-section along the line I—I of FIG. 3, of a welding bench fitted with an aligning device, according to the invention, FIG. 2 is a view along the line II—II of FIG. 1.

DETAILED DESCRIPTION OF THE PREFERRED EMBODIMENT

Figure 3:
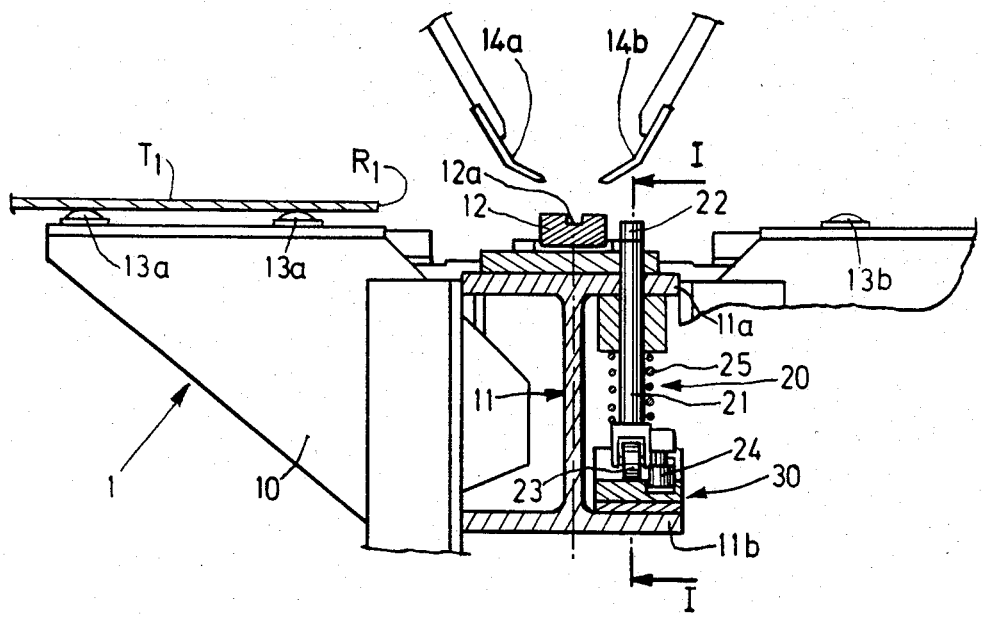
FIG. 3 is a view in cross-section along the line III-—III of FIG. 1 showing the positioning member of the aligning device in the retracted position before the first plate is placed in position.

Referring now to the drawings, these show a longitudinal welding bench for plane plates, denoted by the general reference 1 and provided with an aligning device according to the invention comprising two identical positioning members denoted by the general reference 2.

The bench 1 which is known per se, comprises a framework 10 bearing a beam 11 having an I-shaped cross-section and on which is fitted a batten 12 on which the two edges of the plates which are to be welded come into contact, this batten having a notch 12a acting as a receiver for the lower section of the seam weld and which consequently establishes the line along which the edges $R_1$ and $R_2$ of the plates $T_1$ and $T_2$ are to be placed alongside and welded. The bench 1 also comprises two sets of rollers 13a and 13b placed at either side of the batten 12 and intended to carry the plates $T_1$ and $T_2$, as well as gripping members shown diagrammatically at 14a and 14b. The bench 1 finally comprises a welding torch (not shown) situated above the batten 12, which is displaced longitudinally along the notch 12a.

Each of the positioning members 2 fitted on the beam 11 comprises an L-shaped finger 20 mounted on the upper horizontal flange 11a of the said beam, and a member 30 for control of the said finger 20, mounted on its lower flange 11b.

The finger 20 comprising a vertical rod 21 passing through the flange 11a and provided at its upper part with a horizontal stop 22, is displaceable in vertical translation and in rotation around an axis which also is vertical. At its lower part, the finger 20 comprises two rollers 23 and 24 having horizontal and vertical spindles respectively, arranged to co-operate with the aforesaid control member 30. A return spring 25 tends to return the same to the low position.

Each of the members controlling the vertical and angular positioning of the fingers 20 is formed by a cam 30 displaceable in horizontal translation and capable of being entrained in a direction along one of the arrows F or F' by one and the same entraining member, for example a ram (not illustrated) which is operated manually or by a motor. The cam 30 has a sloping plane 31 on which the roller 23 of the finger 20 held by the spring 25 is borne, and a groove 32 formed by two branches 32a and 32b angularly spaced apart by 90° and in which the aforesaid roller 24 is engaged. One ram only is provided for entraining the two cams, in such manner as to assure synchronised operation of the two positioning members.

The aligning device is utilised in the following manner.

Figure 4:
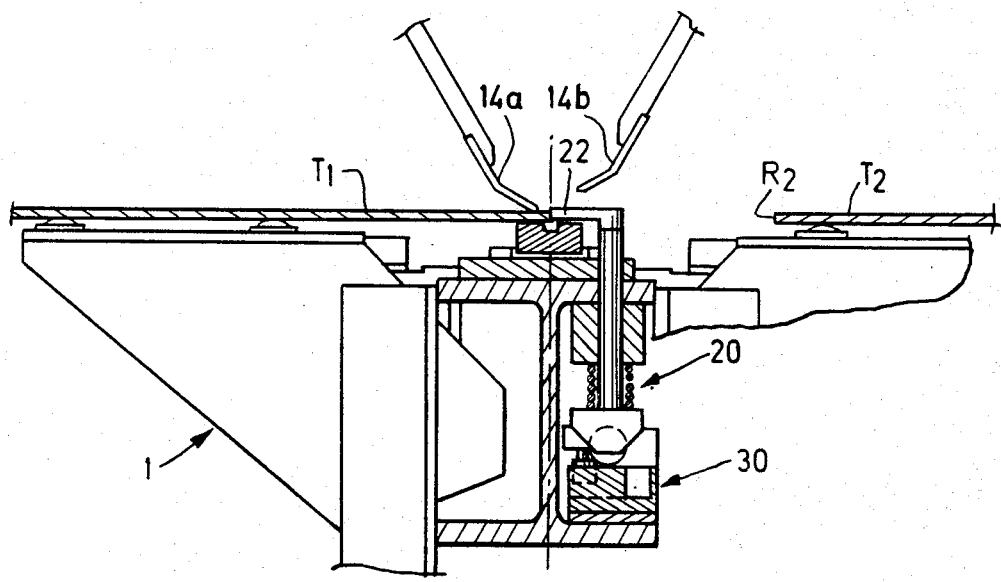
FIG. 4 is a view identical to FIG. 3, but the positioning member being in the active position.
Figure 5:
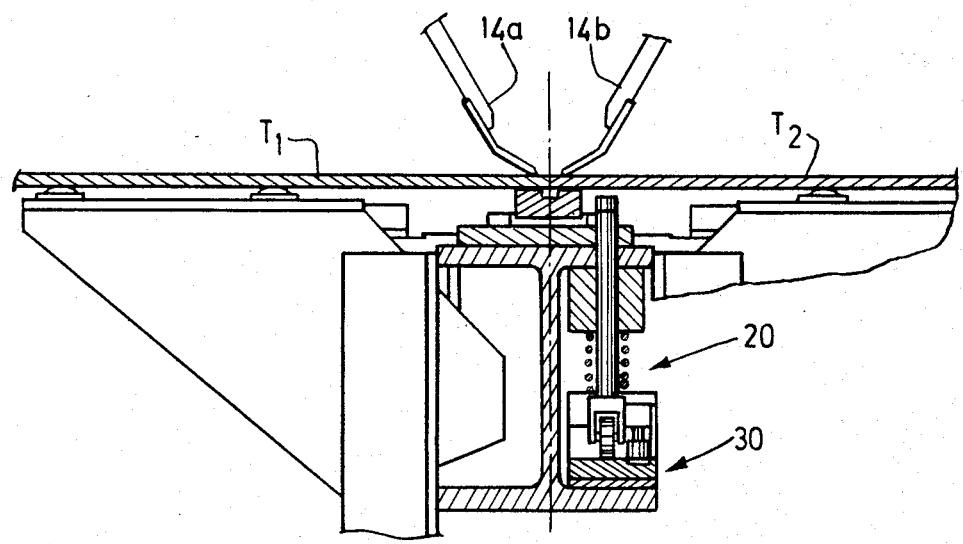
FIG. 5 is a view identical to FIG. 3, but the positioning member again being in the retracted position after the laying alongside of the second plate.

The finger 20 and the cam 30 are caused to occupy the position illustrated in FIGS. 1 to 3, whereupon the ram is actuated in such manner that it drives the said cam leftwards in a direction along the arrow F, the finger 20 is then lifted and upon reaching its point of maximum height, performs a rotation of 90° which places the stop 22 above the batten 12, the free extremities of two stops 22 establishing the line of the joint between the two plates;

the edge $R_1$ of the plate $T_1$ carried by the rollers 13a is placed in contact with the stops 22, the gripping means 14a are actuated in such manner as to hold the plate $T_1$ in position (see FIG. 4);

the ram is operated so that it drives the cam 30 to the right following the direction of arrow F', the finger 21 then performs a rotation of 90° and is then lowered until it assumes the retracted position shown in FIG. 5;

the edge $R_2$ of the plate $T_2$ carried by the rollers 13b is then placed in contact with the edge $R_1$ of the plate $T_1$, and the gripping means 14b are actuated in such manner as to hold the plate $T_2$ in position;

the two edges thus being mutually aligned and secured, it is possible to perform their butt welding without markings.

Numerous modifications may be made to the embodiment described and illustrated without thereby departing from the scope of the invention. For example, it would be possible to mount the positioning members on longitudinal welding benches arranged for circular welding, and which could be provided with a pneumatic or electromagnetic control system instead of a mechanical control device such as the cam 30. Furthermore, the device is not limited in any way to side-by-side alignment of plates with the edges in mutual contact, but could be applied to assemble plates whilst leaving a narrow gap open between the two edges, which is filled subsequently by the welding seam.

We claim:

1. In a combination of a longitudinal welding bench and a device for aligning an edge of a sheet or plate for the purpose of edge-to-edge assembly of the same on said welding bench with another sheet or plate element or with another edge of itself, wherein said device is disposed on said longitudinal welding bench and is provided with a workpiece-carrier beam, of the type comprising a plurality of positioning members situated on a line along which said elements are to be lined up and then welded, the improvement wherein each said positioning member comprises a finger displaceable in vertical translation and in rotation about a vertical axis and a member for controlling its linear and angular positioning, said finger being arranged to assume an active position in which it is in contact with the edge of one of said elements, and a retracted position in which it permits the laying alongside of the edge of a second said element or of another edge of the same said element.

2. The combination according to claim 1, wherein said finger is fitted on said carrier beam.

3. The combination according to claim 2, wherein said control member is also fitted on said carrier beam and comprises a cam movable in horizontal translation co-operating with rollers in unit with said finger.

4. The combination according to claim 3, wherein said cam has a sloping cam surface which controls the vertical position of said finger via the first said roller, and a groove formed by two branches diverging at an angle of 90° and in which is engaged the second said roller.

5. The combination according to claim 4, wherein the first said roller is held in contact on the sloping cam surface via a return spring acting on said finger.

6. The combination according to claim 2, wherein said finger is generally L-shaped, being formed by a vertical pin provided at its upper part with a stop against which said edge comes into contact.

7. The combination according to claim 6, having two positioning members the said stops of which establish the joint line of the workpieces in the active position.

8. The combination according to claim 4, wherein said cams respectively associated with the different said positioning members are all entrained by one ram only.

9. The combination according to claim 1, wherein the members for controlling the positioning of the respective fingers are all actuated by a single ram.

10. The combination according to claim 1, wherein said workpiece-carrier beam includes a longitudinal batten, and said fingers in their retracted position are disposed in a recess alongside and generally parallel to said batten, while in their active positions said fingers are elevated with respect to said batten and extend generally perpendicular to it.

* * * * *